United States Patent [19]  [11]  4,143,085
Funada et al.  [45]  Mar. 6, 1979

[54] METHOD FOR ISOLATING LOW MOLECULAR WEIGHT POLYMER

[75] Inventors: Mitsuaki Funada, Suita; Kazuo Hayatsu, Ibaraki; Takanobu Noguchi, Takatsuki, all of Japan

[73] Assignee: Sumitomo Chemical Co., Ltd., Osaka, Japan

[21] Appl. No.: 815,077

[22] Filed: Jul. 13, 1977

[30] Foreign Application Priority Data

Jul. 22, 1976 [JP] Japan .................. 51-87807

[51] Int. Cl.$^2$ ............................... C07C 7/10
[52] U.S. Cl. .................. 260/677 A; 208/188; 260/680 B; 260/683.15 R; 528/491
[58] Field of Search ...... 260/677 A, 680 B, 683.15 R; 528/491, 492, 493, 495; 208/188

[56] References Cited

U.S. PATENT DOCUMENTS

| 3,000,871 | 9/1961 | Engel | 528/491 |
|---|---|---|---|
| 3,284,429 | 11/1966 | Hofheim et al. | 528/491 |
| 3,326,805 | 6/1967 | Murzyama et al. | 528/491 |
| 3,448,160 | 6/1969 | Schleimer | 260/669 |
| 3,547,855 | 12/1970 | Loveless | 528/492 |
| 3,583,967 | 6/1971 | Hattori et al. | 528/491 |
| 4,022,839 | 5/1977 | Beuther et al. | 260/677 A |

FOREIGN PATENT DOCUMENTS

| 1174507 | 0000 | Fed. Rep. of Germany. |
|---|---|---|
| 1301521 | 8/1969 | Fed. Rep. of Germany. |
| 1413225 | 8/1965 | France. |
| 48-86788 | 1973 | Japan. |

OTHER PUBLICATIONS

Chem. & Engr. News, Feb. 21, 1977, p. 25.

Primary Examiner—C. Davis
Attorney, Agent, or Firm—Birch, Stewart, Kolasch and Birch

[57] ABSTRACT

A method for isolating a low molecular weight polymer from a solution of a low molecular weight polymer having a viscosity of 5 to 100,000 cps at 30° C. and an inactivated catalyst in a hydrophobic organic solvent, which comprises mixing an acidic, alkaline or neutral water or a mixture of the water and a water-soluble organic solvent with the solution containing the low molecular weight polymer in the presence of an amphoteric, cationic or nonionic surfactant or a nonionic or cationic high molecular weight flocculating agent, whereby the separation of the organic layer and the aqueous layer is significantly improved.

13 Claims, No Drawings

METHOD FOR ISOLATING LOW MOLECULAR WEIGHT POLYMER

The present invention relates to a method for isolating a low molecular weight polymer from a solution containing the low molecular weight polymer. More particularly, it relates to a method for isolating a low molecular weight polymer from a solution of a low molecular weight polymer having a viscosity of 5 to 100,000 cps at 30° C. and an inactivated catalyst in a hydrophobic organic solvent by mixing the solution containing the low molecular weight polymer with water or a mixture of water and a water-soluble organic solvent in the presence of an amphotoric, cationic or nonionic surfactant or a nonionic or cationic high molecular weight flocculating agent, whereby the separation of the organic layer and the aqueous layer is significantly improved.

It has, hitherto, been known that when salts, alkaline aqueous solutions or acidic aqueous solutions are added to a polymerization system, the production of emulsion can be prevented, or the produced emulsion can be destroyed. For instance, the destruction of emulsion of styrene-butadiene copolymer can usually be carried out by adding thereto salts. Besides, the destruction of emulsion of petroleum and water can be accomplished by distillating or heating the emulsion under atmospheric or high pressure. Moreover, as a chemical process, it is known to use an anti-foaming agent. It is also known to separate the emulsion by centrifugation or filtration. However, the emulsion, to which these processes are applied, is an emulsion of petroleum and water and hence has a lower viscosity, such as less than several centipoises.

Methods for removing catalysts from a solution of polymers are described in German Pat. No. 1,174,507, and French Pat. No. 1,413,225. These methods comprise adding a small amount of alcohol, ketones or amines to a polymer solution after polymerization reaction in order to stop the polymerization reaction, adding thereto a large amount of alcohols and thereby precipitating the polymer, and distilling off the mixture of hydrocarbon solvents and alcohols, whereby the polymer is separated. According to these methods, however, multiple fractionating columns are required for separating the alcohols having close boiling points, which is disadvantageous for practising on a industrial scale. When water is used instead of a alcohol as the solvent, such a defect can be eliminated, but another disadvantage is accompanied.

That is, as the result of the present inventors' study, when a solution of a low molecular weight polymer in an organic solvent is admixed with an acidic, alkaline or neutral water or a mixture of the water and a water-soluble organic solvent until a homogeneous emulsion is produced, the resulting emulsion is hardly separated into each phase, and hence, it is very difficult to wash or to remove the sovent therefrom, particularly, the dehydration thereof is extremely difficult.

Besides, Japanese Patent Publication No. 6548/1970 describes a method for isolating a low molecular weight polybutadiene or a low molecular weight butadiene-styrene copolymer from a solution of the polymer in an organic solvent wherein an inactivated catalyst is dissolved or suspended. This Japanese patent is concerned with a method for separating a catalyst from a solution of liquid polybutadiene or a copolymer thereof with 1,3-diolefin in a hydrocarbon solvent, which comprises mixing the polymer solution after inactivation of the catalyst with a water at a temperature of 50° C. or higher, preferably 75° C. or higher and allowing the resulting emulsion to stand to separate the aqueous layer and the layer of polymer solution.

According to the present inventors' study, it has been found that in case of a low molecular weight polymer having a viscosity of 450 cps or more at 30° C., the separation of the solution can be effected within several to several tens minutes by the above methods as described in Japanese Patent Publication No. 6548/1970, but in case of an extremely low molecular weight polymer having a viscosity of 5 to 450 cps at 30° C. as disclosed in Japanese Patent Laid Open Publication (without examination) No. 89788/1974, the polymer gives a very stable emulsion when it is admixed with water, and hence, when the emulsion is separated by the method of the above Japanese Patent Publication No. 6548/1970, the aqueous layer and the layer of the polymer solution can not be separated within several minutes, but 24 hours or a longer time is required for the complete separation thereof. Moreover, since fine particles of water are dispersed in the polymer solution, the particles of water are retained in the organic layer even after the separation thereof and the evaporation of solvents from the organic layer is carried out insufficiently so as to result in turbidity of the resulting polymer. Further removal of water therefrom uneconomically requires an additional step of distillation thereof under reduced pressure at a high temperature for a long period of time.

It has now been found in accordance with the present invention that these defects as in the known methods can be eliminated by mixing the polymer solution with water or a mixture of water and a water-soluble organic solvent in the presence of an amphoteric, cationic or nonionic surfactant or a nonionic or cationic high molecular weight flocculating agent. According to the present method, the separation can easily and sharply be accomplished without limitation of the temperature, i.e. even at room temperature. Moreover, since the amount of water remaining in the organic layer is very little, the organic layer can be evaporated and dried merely by distilling the hydrocarbon solvents under atmospheric or reduced pressure conditions for a short period of time, which is very advantageous for procedure on an industrial scale, particularly in the case of washing several times the polymer solution with water or a mixture of water and a water-soluble organic solvent because the time required for the procedure can extremely be saved. The amount of organic materials contaminating into the aqueous layer can also be greatly decreased.

An object of the present invention is to provide an improved method for the isolation of a low molecular weight polymer from a solution of the polymer and catalyst in organic solvent.

Another object of the invention is to provide a method for separating efficiently the aqueous layer and the organic layer of the emulsion containing a low molecular weight polymer.

A further object of the invention is to provide an economical method for the isolation of a low molecular weight polymer from the polymer emulsion.

These and other objects of the invention will become apparent from the following detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The method for isolating a low molecular weight polymer from a solution containing the low molecular weight polymer of the present invention comprises mixing a solution of a low molecular weight polymer having a viscosity of 5 to 100,000 cps at 30° C. and an inactivated catalyst in a hydrophobic organic solvent with a neutral, acidic or alkaline water or a mixture of the water and a water-soluble organic solvent in order to wash the polymer solution in the presence of an amphoteric, cationic or nonionic surfactant or a nonionic or cationic high molecular weight flocculating agent, allowing the resulting mixture to stand to separate into the aqueous layer and the organic layer, and then recovering the low molecular weight polymer from the organic layer.

The low molecular weight polymer to which the method of the present invention can be applied, includes low molecular weight polymers to hydrocarbons, i.e. diene polymers such as conjugated diolefinic homopolymers or copolymers, copolymers of conjugated diolefins and aromatic vinyl compounds, copolymers of conjugated diolefins and olefins, copolymers of conjugated diolefins and acetylene, or copolymers of conjugated diolefins, aromatic vinyl compounds and olefins; olefinic polymers; or the like. Suitable examples of the low molecular weight polymers are polybutadiene, polyisoprene, polypentadiene, polycyclopentadiene, butadiene-isoprene copolymer, butadiene-pentadiene copolymer, isoprene-pentadiene copolymer, isoprene-cyclopentadiene copolymer, butadiene-styrene copolymer, isoprene-styrene copolymer, styrene-pentadiene copolymer, butadiene-p-chlorostyrene copolymer, butadiene-acetylene copolymer, and isoprene-acetylene copolymer, which have a viscosity of 5 to 100,000 cps at 30° C. Examples of the olefins in the conjugated diolefin-olefin copolymers are ethylene, propylene, butene-1, isobutylene, pentene-1, hexene-1, or the like. The copolymers of the conjugated diolefins, aromatic vinyl compounds and olefins are the combinations of the above mentioned monomers. The olefin polymers include low molecular weight polymers of ethylene, propylene, butene-1, isobutylene, pentene-1, hexene-1, or the like. So-called petroleum resins are also included in the low molecular weight polymers used in the present invention. These low molecular weight polymers may be produced by the methods as disclosed in Japanese Patent Laid Open Publication (without examination) Nos. 89788/1974, 115189/1974, 23883/1973, 23884/1973, 63780/1974 and 86992/1973, and Japanese Patent Publication Nos. 5616/1974 and 2083/1974. The method of the present invention can also be applied to the oligomers produced by hydrogenating the above polymers in the range of 10 to 100%.

The polymerization is carried out in a hydrophobic organic solvent, such as heptane, hexane, pentane, octane, nonane, decane, benzene, toluene, xylene, or other alkylated aromatic compounds, which may be used alone or in a combination thereof.

The concentration of the polymer solution before stopping the polymerization is in the range of 1 to 95% by weight, usually 20 to 80% by weight, in benzene, toluene, xylene, hexane, or a mixture thereof with an aliphatic compound.

Catalysts used in the polymerization include Ziegler Natta catalysts, anionic or cationic polymerization catalysts, or the like. In order to stop the polymerization, the catalyst is inactivated by a conventional method, for instance, by adding to the polymerization system a small amount of an alcohol, an amine, a ketone, a diketone, an ester, water, or the like.

The washing water used for washing the polymer solution includes a neutral water (e.g. tap water, distilled water, demineralized water), an acidic water, an alkaline water, and a mixture of one of these waters and a water-soluble organic solvent. Acids used for the acidic water include inorganic acids (e.g. hydrochloric acid, sulfuric acid, phosphoric acid, sodium hydrogen sulfate, nitric acid) and organic acids (e.g. acetic acid, oxalic acid, formic acid). Alkalis used for the alkaline water include sodium hydroxide, potassium hydroxide, sodium hydrogen carbonate, or the like. The washing water may have various pH values from 0.1 to 13. The water-soluble organic solvents include alcohols (e.g. methanol, ethanol, propanol, isopropanol), ketones (e.g. acetone, methyl ethyl ketone, diethyl ketone, methyl isobutyl ketone), carboxylic acid esters (e.g. ethyl formate, ethyl acetate), tetrahydrofuran, dimethylformamide, ethanolamine, dimethylsulfoxide, or the like. The amount of the water-soluble organic solvent in the mixture thereof with water is in the range of 90% by weight or lower, preferably 40 to 85% by weight, based upon the total weight of the mixture.

The washing water is used in an amount of 0.1 to 10 parts by weight, usually 0.2 to 3 parts by weight, to 1 part by weight of the polymer solution to be washed.

Examples of the nonionic or cationic high molecular weight flocculating agent are polyvinylpyridine hydrochloride, polyethyleneimine, polyacrylamide, polyacrylamide modified with an cation, polyethylene oxide, polypropylene oxide, or the like.

Surfactants include cationic surfactants, nonionic surfactants and amphoteric surfactants. Suitable examples of the surfactants are quaternary ammonium salts (e.g. lauryl trimethyl ammonium chloride, stearyl trimethyl ammonium chloride, dilauryl dimethyl ammonium chloride, distearyl dimethyl ammonium chloride, lauryl benzyl dimethyl ammonium chloride or stearyl benzyl dimethyl ammonium chloride, imidazoline laurate, imidazoline oleate, laurylbetaine, stearylbetaine, sorbitan monostearate, sorbitan tristearate, sorbitan monooleate, sorbitan trioleate, sorbitan sesquioleate, sorbitan distearate, glycerol monooleate, glycerol monostearate, or the like.

These high molecular weight flocculating agents and surfactants may be used alone or in the combination of two or more thereof. Both of the flocculating agents and the surfactants may be used together, or each of them may be used together with an appropriate salt.

The high molecular weight flocculating agents may be used in an amount of 0.1 to 100 ppm by weight, preferably 0.5 to 30 ppm by weight, based upon the weight of the washing water. The surfactants may be used in an amount of 0.001 to 0.5 part by weight, preferably 0.003 to 0.1 part by weight, to 100 parts by weight of the washing water. The flocculating agents and surfactants may previously be dissolved in the washing water, or may be added to the emulsion produced by mixing the polymer solution to be washed and the washing water.

The washing of the polymer solution may be carried out by mixing continuously the washing water and the polymer solution with a line mixer, or may be carried out by mixing homogeneously the washing water and the polymer solution in a vessel in batch system. The homogeneous mixing is effected by the mixing time, number of revolutions, baffle, or the like. Temperature for mixing or of the mixture is not specified, but may be usually from 0° to 150° C., preferably 0° to 80° C., and is usually room temperature.

The thus washed polymer solution can be separated within a very short time, while it is a homogeneous emulsion. When the washed polymer solution is passed through a column which is filled with materials having fine pores, agglomerate of fine cellulosic materials, or agglomerate of fine particles (e.g. sands, powdery metals, rock powders, polyethylene powders, ion exchange resins, plastic powders, or glass beads), the separation into the aqueous layer and the organic layer can be accomplished within a shorter time, and further, the interface of both layers becomes clearer without occurrence of the intermediate layer.

The mixture thus treated is then allowed to stand, whereby the upper layer (organic layer) comprising the hydrophobic organic solvent containing the low molecular weight polymer and the lower layer (aqueous layer) are clearly separated. The organic layer is isolated, and the solvent is removed therefrom by evaporating the organic layer under atmospheric or reduced pressure or by evaporating the organic layer in the filmy state under atmospheric or reduced pressure, whereby the low molecular weight polymer can be recovered.

Thus, according to the method of the present invention, the low molecular weight polymer having low solid content can be obtained within a very short period of time by the very simple procedure.

The present invention is illustrated by the following Examples, but is not limited thereto.

EXAMPLE 1

Butadiene was polymerized in toluene at 40° C. in the presence of a Ziegler catalyst to give a liquid polybutadiene having a molecular weight: 350, viscosity: 32 cps at 30° C., micro structure of cis-1,4 structure: 56.2%, trans-1,4 structure: 34.0% and vinyl structure: 9.8%, and iodine value: 451. The concentration of the polymer solution was 65% by weight. The polymerization reaction was stopped by adding a small amount of methanol to the polymerization reaction system.

The polymer solution (300 ml) and an aqueous solution of hydrochloric acid containing the surfactant as shown in the following Table 1 (pH: 2, 300 ml) were charged into a 1000 ml flask equipped with a baffle, and the mixture was homogeneously mixed with agitation at 1640 rpm for 30 minutes.

When the agitation was stopped, the mixture was immediately separated into two layers. The lower aqueous layer was removed and the upper organic layer was washed twice with distilled water (each 300 ml) containing a surfactant, wherein the separation speed in this washing step was the same as that in the first washing step.

The organic layer thus treated was then evaporated at 60° to 70° C. (temperature of water bath) under 20 mmHg for 30 minutes in order to remove toluene to give a completely transparent polymer (160 g).

The polymer thus obtained had a toluene content: less than 0.1% by weight and water content: 35 ppm, from which it is clear that the moisture and the solvent were almost completely removed off.

The separation speed and the solid contents in the above procedure using various surfactants are shown in the following Table 1.

REFERENCE EXAMPLE 1

When the same polymer solution as used in Example 1 (300 ml) was washed with an aqueous solution of hydrochloric acid containing no surfactant (pH: 2, 300 ml) in the same manner as described in Example 1, the emulsion was not separated even after allowing to stand at room temperature for 24 hours. After 4 days, the separation was not sufficiently accomplished and the interface was unclear. Accordingly, the washing with water could not be done.

REFERENCE EXAMPLE 2

The same emulsion as used in Reference Example 1 was heated at 70° C. and then allowed to stand. The emulsion (200 ml) was separated into two layers after 4 hours, but the interface was still unclear and was partially turbid. The organic layer was further washed with water to remove hydrochloric acid, that is, distilled water (100 ml) was added to the polymer solution (100 ml) and the mixture was homogeneously mixed with agitation at 1640 rpm and heated at 70° C. and then allowed to stand. The resulting emulsion was separated into two layers after 5 hours. The organic layer was again washed with water and separated in the same manner as above. After removing off the solvent in the same manner as in Example 1, the solid content of the resulting polymer was measured. The polymer had a solid content: 60 ppm, nickel: 2 ppm, aluminum: 7 ppm. According to this method, the catalyst was removed off, but the separation of the aqueous layer required too much time.

REFERENCE EXAMPLE 3

Example 1 was repeated except that sodium dodecylbenzene sulfonate (an anionic surfactant) was used as the surfactant. As the result, the emulsion was not sufficiently separated into two layers, but was partially turbid, and hence, the washing thereof with water could not sufficiently be done.

REFERENCE EXAMPLE 4

The polymer solution as used in Example 1 (200 ml) was evaporated to remove the solvent in the same manner as described in Example 1 without washing with an aqueous solution of hydrochloric acid, and then the solid content was measured. As the result, the polymer thus recovered had solid content: 0.15% by weight, aluminum: 0.083% by weight, and nickel: 0.028% by weight.

Table 1

| Example No. | Surfactant Kind | Amount (g/liter) | Separation time | Total solid content (% by weight) | Nickel content (% by weight) | Aluminum content (% by weight) |
|---|---|---|---|---|---|---|
| | sorbitan tristearate | 0.05 | 15 min. | 0.005 | 0.0004 | 0.0012 |

Table 1-continued

| Example No. | Surfactant Kind | Amount (g/liter) | Separation time | Total solid content (% by weight) | Nickel content (% by weight) | Aluminum content (% by weight) |
|---|---|---|---|---|---|---|
| | " | 0.1 | 7 | 0.005 | 0.0003 | 0.0008 |
| | " | 0.3 | 10 | 0.006 | 0.0003 | 0.0007 |
| Example 1 | Glycerol monostearate | 0.05 | 13 | 0.006 | 0.0004 | 0.0010 |
| | " | 0.1 | 15 | 0.006 | 0.0004 | 0.0010 |
| | Stearyl trimethyl ammonium chloride | 0.05 | 11 | 0.005 | 0.0002 | 0.0008 |
| | " | 0.1 | 6 | 0.005 | 0.0002 | 0.0008 |
| | " | 0.3 | 5 | 0.005 | 0.0002 | 0.0007 |
| | Stearyl betaine | 0.01 | 20 | 0.005 | 0.0003 | 0.0010 |
| | " | 0.1 | 10 | 0.005 | 0.0003 | 0.0012 |
| | Imidazoline oleate | 0.1 | 25 | 0.005 | 0.0004 | 0.0010 |
| Reference Example 1 | — | — | More than 24 hours | — | — | — |
| Reference Example 2 | — | — | 4–5 hours | 0.006 | 0.0002 | 0.0007 |
| Reference Example 4 | — | — | — | 0.150 | 0.028 | 0.083 |
| Reference Example 3 | Sodium dodecylbenzene-sulfonate | 0.1 | More than 5 hours | 0.030 | 0.0011 | 0.0032 |
| | " | 0.3 | More than 15 hours | 0.055 | 0.0091 | 0.022 |

EXAMPLE 2

The same polymer solution as used in Example 1 (300 ml) was treated with an aqueous solution of hydrochloric acid containing no surfactant (pH: 2, 300 ml) in the same manner as described in Example 1 to give a stable emulsion. The emulsion was divided into three portions (each 200 ml). To each emulsion was added demineralized water containing the surfactant as shown in the following Table 2 (10 ml), and the mixture was mixed with agitation for 10 minutes and then allowed to stand. After several minutes to 20 minutes, the mixture was completely separated into two layers and the interface was clear.

The organic layer was further washed with water in order to remove hydrochloric acid. That is, distilled water (100 ml) was added to the polymer solution (100 ml), and the mixture was treated in the same manner as described above. The mixture was clearly separated into two layers. The organic layer was treated in the same manner as described in Example 1, and the solid content of the resulting polymer was measured. The results are shown in Table 2.

EXAMPLE 3

The polymer solution (200 ml) as treated in the same manner as described in Example 1 was added with agitation to a glass-made column (inside diameter: 20 mm, length: 600 mm) which was filled with sea sands or glass beads with a pump and was passed through the column at room temperature under a pressure of 0.2 kg/cm2 over a period of 8 minutes. The mixture passed through the mixture was immediately completely separated into two layers. The organic layer was taken out and thereto was added distilled water containing a surfactant (130 ml). While mixing with agitation at 3200 rpm, the mixture was passed through the column likewise over a period of 9 minutes. The organic layer separated from the passed mixture was further washed with water, and was separated into two layers likewise. After removing toluene from the organic layer under reduced pressure, the solid content of the resulting polymer was measured. The results are shown in the following Table 3.

Table 3

| Example No. | Surfactant Kind | Amount (g/liter) | Separation time | Total solid content (% by weight) | Nickel content (% by weight) | Aluminum content (% by weight) |
|---|---|---|---|---|---|---|
| | Sorbitan tristearate | 0.1 | Less than 1 minute | 0.005 | 0.0003 | 0.0006 |
| | Glycerol monostearate | 0.1 | " | 0.005 | 0.0003 | 0.0007 |
| Example 3 | Stearyl trimethyl ammonium chloride | 0.1 | " | 0.005 | 0.0003 | 0.0007 |
| | Stearyl betaine | 0.1 | " | 0.005 | 0.0002 | 0.0007 |

EXAMPLE 4

Butadiene was polymerized in toluene at 60° C. in the presence of a Ziegler catalyst to give a liquid polybuta- Table 2

| Example No. | Surfactant Kind | Amount (g/liter) | Separation time | Total solid content (% by weight) | Nickel content (% by weight) | Aluminum content (% by weight) |
|---|---|---|---|---|---|---|
| Example 2 | Sorbitan tristearate | 0.1 | 12 min. | 0.005 | 0.0003 | 0.0010 |
| | Stearyl trimethyl ammonium chloride | 0.1 | 15 | 0.006 | 0.0004 | 0.0010 |
| | Stearyl betaine | 0.1 | 20 | 0.005 | 0.0003 | 0.0010 | diene having a molecular weight: 1680, viscosity: 451 cps at 30° C., micro structure of cis-1,4 structure: 78.3%, tran-1,4 structure: 20.8% and vinyl structure: 0.9%, and iodine value: 450. The concentration of the polymer was 61% by weight. The polymerization reaction was stopped by adding thereto a small amount of methanol.

The polymer solution was treated in the same manner as described in Example 1. The results are shown in the following Table 4.

water and the subsequent separation thereof were additionally repeated twice. When the resulting organic layer was concentrated under reduced pressure, the water contained in the polymer was not sufficiently removed and the polymer was turbid. In order to eliminate the turbidity, the polymer was evaporated under a reduced pressure of 5 mmHg at a bath temperature of 60° to 70° C., but the efficiency thereof was very low. The solid content of the resulting polymer was measured. The results are shown in Table 4.

Table 4

| Example No. | Surfactant Kind | Amount (g/liter) | Separation time | Total solid content (% by weight) | Nickel content (% by weight) | Aluminum content (% by weight) |
| --- | --- | --- | --- | --- | --- | --- |
| Example 4 | Sorbitan tristearate | 0.05 | 9 min. | 0.005 | 0.0003 | 0.0010 |
| | Glycerol monostearate | 0.05 | 13 | 0.006 | 0.0003 | 0.0013 |
| | Stearyl trimethyl ammonium chloride | 0.01 | 15 | 0.005 | 0.0003 | 0.0014 |
| | Stearyl betaine | 0.1 | 13 | 0.005 | 0.0003 | 0.0013 |
| Reference Example 5 | — | — | 24 hours | 0.028 | 0.0026 | 0.015 |

REFERENCE EXAMPLE 5

The polymer solution as used in Example 4 was treated with a distilled water containing no surfactant (pH: 2) and the resulting emulsion (200 ml) was allowed to stand at room temperature. The emulsion was not sufficiently separated within 10 hours, and was further allowed to stand for 24 hours (in total). The organic layer was separated and thereto was added distilled water (130 ml), and the mixture was mixed with agitation at 3200 rpm at room temperature for 20 minutes and then allowed to stand. Even after 15 hours, the mixture was not sufficiently separated into two layers. After 24 hours, the mixture was roughly separated into two layers. The washing of the organic layer with

EXAMPLE 5 AND REFERENCE EXAMPLE 6

Example 1 was repeated except that high molecular weight flocculating agents as shown in the following Table 5 were used instead of the surfactants. The results are shown in Table 5.

Table 5

| Example No. | High molecular weight flocculating agent Kind | Amount (g/liter) | Separation time | Total solid content (% by weight) | Nickel content (% by weight) | Aluminum content (% by weight) |
| --- | --- | --- | --- | --- | --- | --- |
| Example 5 | Sumifloc FN-10H* | 0.003 | 15 min. | 0.005 | 0.0005 | 0.0012 |
| | Sumifloc FN-20H* | 0.005 | 20 | 0.005 | 0.0006 | 0.0013 |
| | Sumifloc FC L* | 0.005 | 5 | 0.004 | 0.0003 | 0.0009 |
| | Sumifloc FC-50* | 0.010 | 7 | 0.005 | 0.0004 | 0.0010 |
| Reference Example 6 | Sumifloc FA-40 | 0.010 | More than 10 hours | 0.040 | 0.0075 | 0.016 |

*Tradenames of high molecular weight flocculating agents comprising polyacrylamides (made by Sumitomo Chemical Company, Limited):
Sumifloc FN: nonionic high molecular weight flocculating agent
Sumifloc FC: Catonic high molecular weight flocculating agent
Sumifloc FA: Anionic high molecular weight flocculating agent

EXAMPLE 6

Example 1 and Example 5 were each repeated except that water-methanol and water-acetone were used instead water as the washing water. The results are shown in the following Table 6.

Table 6

| Washing water | Surfactant or Flocculating agent Kind | Amount (g/liter) | Separation time | Total solid content (% by weight) | Nickel content (% by weight) | Aluminum content (% by weight) |
| --- | --- | --- | --- | --- | --- | --- |
| Water-Methanol (90:10, ratio by weight) | — | — | More than 5 hours | 0.007 | 0.0003 | 0.0010 |
| | Sorbitan tristearate | 0.1 | 5 min. | 0.005 | 0.0002 | 0.0007 |
| | Stearyl trimethyl ammonium chloride | 0.1 | 6 min. | 0.005 | 0.0002 | 0.0009 |
| | Stearyl betaine | 0.1 | 5 min. | 0.005 | 0.0002 | 0.0007 |
| | Sumifloc FCL | 0.005 | 5 min. | 0.004 | 0.0002 | 0.0009 |
| Water-acetone (90:10, ratio by weight) | — | — | More than 5 hours | 0.009 | 0.0005 | 0.0010 |
| | Stearyl betaine | 0.1 | 5 min. | 0.005 | 0.0003 | 0.0008 |
| | Sumifloc FCL | 0.005 | 5 min. | 0.005 | 0.0003 | 0.0008 |

EXAMPLE 7

C₅ fraction obtained by naphtha cracking was polymerized in heptane at 60° C. in the presence of aluminum trichloride (as the catalyst) to give a petroleum resin having a viscosity: 15,600 cps at 30° C. The concentration of the polymer solution was 39% by weight. To the polymer solution (500 ml) was added an alkaline water containing stearyl trimethyl ammonium chloride (0.05 g) (pH: 12, 500 ml), and the mixture was homogeneously mixed with agitation at 3200 rpm at room temperature for 15 minutes. After stopping the agitation, the mixture was allowed to stand. After 15 minutes, the mixture was completely separated into the organic layer and the aqueous layer.

The organic layer was washed with the above distilled water containing a surfactant (500 ml) and then the mixture was separated into two layers in the same manner as described above. This procedure was repeated twice. The resulting polymer solution (organic layer) was concentrated under reduced pressure, and then the solid content of the polymer was measured. As the result, the polymer had a solid content: 0.016% by weight and aluminum content: 0.0008% by weight.

REFERENCE EXAMPLE 8

The emulsion mixed with the alkaline water (pH: 12) as in Example 7 was allowed to stand at room temperature. Even after 40 minutes, the emulsion was not sufficiently separated into two layers. After repeating the washing with water twice, the solid content of the resulting polymer was resulting polymer was measured. As the result, the polymer had a solid content: 0.054% by weight.

The invention being thus described, it will be obvious that the same may be varied in many ways. Such variations are not to be construed as a departure from the spirit and scope of the invention, and all such modifications as would be obvious to one skilled in the art are intended to be included within the scope of the following claims.

What is claimed is:

1. In a method for isolating a low molecular weight polymer from a solution of a low molecular weight diene polymer having a viscosity of 5 to 100,000 cps at 30° C. and an inactivated catalyst in a hydrophobic organic solvent, by mixing the solution containing the low molecular weight polymer with water or a mixture of water and a water-soluble organic solvent, allowing the resulting mixture to stand and to separate into an aqueous layer and an organic layer and then recovering the low molecular weight polymer from the organic layer, the improvement which comprises mixing the solution containing the low molecular weight polymer with water or the mixture of water and a water-soluble organic solvent in the presence of an amphoteric, cationic or nonionic surfactant or a nonionic or cationic high molecular weight flocculating agent at a temperature of from 0° to 80° C.

2. The method according to claim 1, wherein the water is selected from at least one member of the group consisting of a neutral water, an acidic water and an alkaline water.

3. The method according to claim 1, wherein the mixture of water and a water-soluble organic solvent contains 90% by weight or lower of the water-soluble organic solvent based upon the total weight of the mixture.

4. The method according to claim 3, wherein the content of the water-soluble organic solvent in the mixture is in the range of 40 to 85% by weight based upon the total weight of the mixture.

5. The method according to claim 1, wherein the water-soluble organic solvent is selected from at least one member of the group consisting of an alcohol, a ketone, a carboxylic acid ester, tetrahydrofuran, dimethylformamide, ethanolamine and dimethylsulfoxide.

6. The method according to claim 1, wherein water or the mixture of water and a water-soluble organic solvent is used in an amount of 0.1 to 10 parts by weight to 1 part by weight of the polymer solution.

7. The method according to claim 6, wherein the amount of water or the mixture of water and a water-soluble organic solvent is in the range of 0.2 to 3 parts by weight to 1 part by weight of the polymer solution.

8. The method according to claim 1, wherein the high molecular weight flocculating agent is selected from at least one member of the group consisting of polyvinylpyridine hydrochloride, polyethyleneimine, polyacrylamide, polyacrylamide modified with a cation, polyethylene oxide and polypropylene oxide.

9. The method according to claim 1, wherein the surfactant is selected from at least one member of the group consisting of lauryl trimethyl ammonium chloride, stearyl trimethyl ammonium chloride, dilauryl dimethyl ammonium chloride, distearyl dimethyl ammonium chloride, lauryl benzyl dimethyl ammonium chloride, stearyl benzyl dimethyl ammonium chloride, imidazoline laurate, imidazoline oleate, laurylbetaine, stearylbetaine, sorbitan monostearate, sorbitan tristearate, sorbitan monooleate, sorbitan trioleate, sorbitan sesquioleate, sorbitan distearate, glycerol monooleate and glycerol monostearate.

10. The method according to claim 1, wherein the high molecular weight flocculating agent is used in an amount of 0.1 to 100 ppm by weight based upon the weight of water or the mixture of water and a water-soluble organic solvent.

11. The method according to claim 10, wherein the amount of the high molecular weight flocculating agent is in the range of 0.5 to 30 ppm by weight.

12. The method according to claim 1, wherein the surfactant is used in an amount of 0.01 to 0.5 part by weight to 100 parts by weight of water or the mixture of water and a water-soluble organic solvent.

13. The method according to claim 12, wherein the amount of the surfactant is in the range of 0.003 to 0.1 part by weight.

* * * * *